United States Patent [19]
Hart et al.

[11] Patent Number: 5,462,243
[45] Date of Patent: Oct. 31, 1995

[54] AIRCRAFT PASSENGER WINDOW MAINTENANCE SHIELD

[76] Inventors: Raymond F. Hart; Michele A. Hart, both of 2121 S. Pennington St. Suite 17, Mesa, Ariz. 85202

[21] Appl. No.: 193,744
[22] Filed: Feb. 9, 1994
[51] Int. Cl.$^6$ ............................... B64D 47/00; B64F 5/00
[52] U.S. Cl. ...................... 244/121; 244/129.3; 451/457; 451/29
[58] Field of Search ............................ 244/129.3, 129.4, 244/121; 451/439, 457, 445, 451, 29; 118/504, 505

[56] References Cited

U.S. PATENT DOCUMENTS

| | | | |
|---|---|---|---|
| D. 325,249 | 4/1992 | Kliebert . | |
| 2,693,785 | 11/1954 | West, Jr. . | |
| 2,992,392 | 1/1960 | Mund | 118/505 |
| 4,620,503 | 11/1986 | Pullens | 451/457 X |
| 4,662,780 | 11/1986 | Tingley . | |
| 4,969,914 | 11/1990 | Ikegaya et al. . | |
| 5,354,377 | 10/1994 | Jeffrey, Jr. | 118/505 |

OTHER PUBLICATIONS

Boeing 737 Ref: Maintenance Manual Passenger Cabin Approved Repairs.

*Primary Examiner*—William Grant
*Attorney, Agent, or Firm*—Tom Hamill, Jr.

[57] ABSTRACT

An aircraft passenger window maintenance shield is provided to form a protective barrier about an aircraft window to prevent damage to the area surrounding the window during a window outer pane external surface repair procedure involving rotary power equipment. Two generally rectangular panels each having a generally half-window shaped opening are slidingly interfit with one another and snap-fit onto the window frame in such a fashion as to form an aircraft window shaped opening in the area of the aircraft window. The two panels interfit such that a first overlapped edge of the first panel is overlapped by a second overlapping edge of the second panel, and a second overlapped edge of the second panel is overlapped by a first overlapping edge of the first panel. In this fashion, the rotary power equipment is not damaged by the panels, nor are the panels pulled apart by the action of the rotary power equipment. The panels are bent in a slightly arcuate fashion to conform to the slight arc of the outer aircraft surface. Sidewalls are provided about the outer perimeter of the two slidingly interfit panels to prevent the various grits and window polishing agents from damaging or discoloring the aircraft skin.

17 Claims, 4 Drawing Sheets

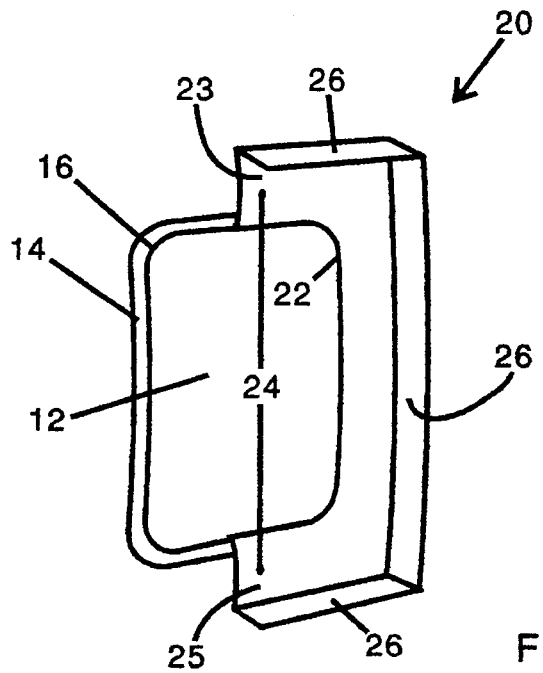
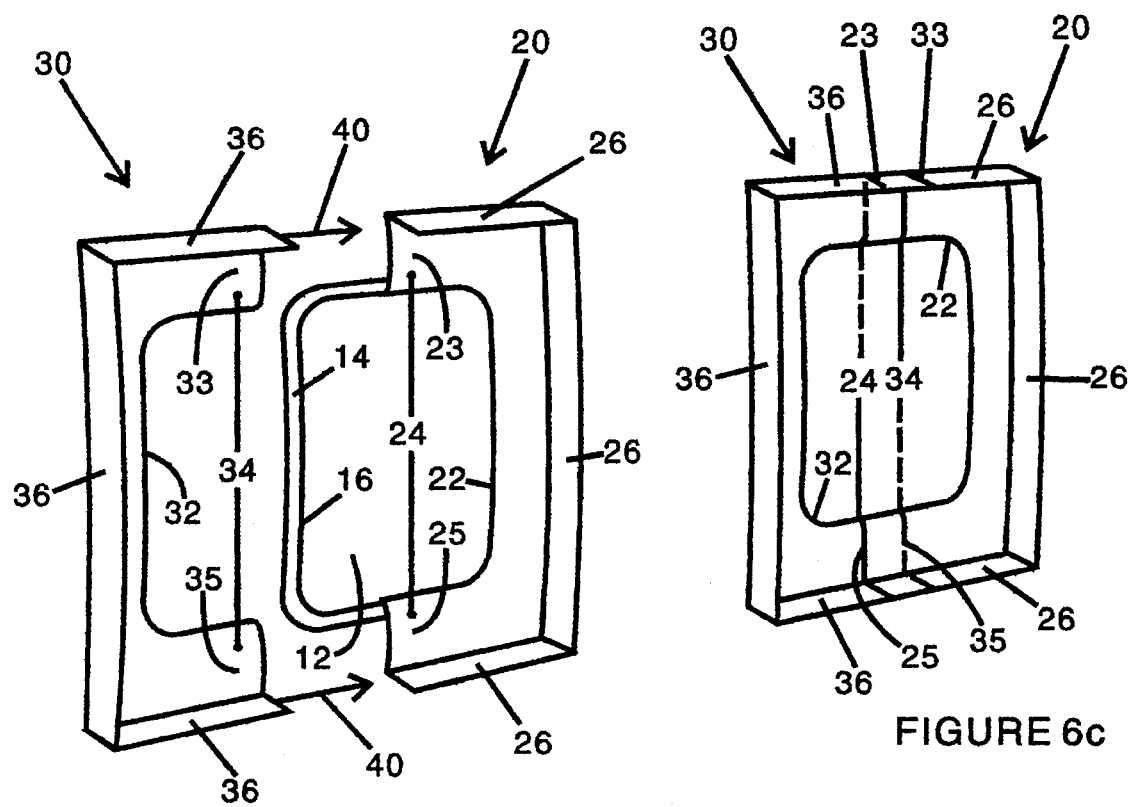
FIGURE 6a
FIGURE 6b
FIGURE 6c

AIRCRAFT PASSENGER WINDOW MAINTENANCE SHIELD

BACKGROUND OF THE INVENTION

1. Field of the Invention

The present invention relates generally to polishing and abrading of aircraft passenger windows, and more particularly, to an easily attachable maintenance shield to protect the aircraft painted surface during the polishing process.

2. Description of the Prior Art

The window outer pane external surface repair procedure includes the use of taping the window frame and seal to prevent possible damage which may be caused by the abrasive grits, buffing and polishing compounds. This tape must be applied individually to each window and then removed once the repair procedure has been completed. The taping procedure is labor intensive and the tape, during its removal, tends to remove the paint from the aircraft surface requiring further costly maintenance.

Thus, while the foregoing indicates it to be well known to use tape to form a protective barrier about the aircraft window during the outer pane external surface repair procedure, the provision of a more simple and cost effective mechanical device is not contemplated. Nor does the current techniques art described above teach or suggest an aircraft passenger window snap on maintenance shield which may be applied to each window successively and which may be used by individuals engaged in such routine aircraft maintenance. The foregoing disadvantages of the current maintenance techniques are overcome by the unique snap lock feature of the present invention as will be made apparent from the following description thereof. Other advantages of the present invention over the prior art also will be rendered evident.

SUMMARY OF THE INVENTION

To achieve the foregoing and other advantages, the present invention, briefly described, provides an aircraft passenger window maintenance shield to form a protective barrier about the aircraft window to prevent damage to the area surrounding the aircraft window during the window outer pane external surface repair procedure. Two generally rectangular panels each having a generally half window shaped opening are snapped fitted onto the passenger window frame in such a fashion to form an opening about the aircraft window. The two panels slidingly interfit and coact to form a complete barrier about the aircraft window frame with an aircraft window shaped opening being centrally located thereon to permit access to the aircraft window. The two panels coact in such a fashion where a first overlapped edge of the first panel is overlapped by a second overlapping edge of the second panel and a second overlapped edge of the second panel is overlapped by a first overlapping edge of the first panel. In this manner the rotary power equipment is not damaged by the panels nor are the panels pulled apart by the rotary power equipment. The panels are bent in a slightly arcuate fashion to conform to the slight arc of the outer aircraft surface. Sidewalls are provided about the outer perimeter of the two slidingly interfitted panels to prevent the various grits and window polishing agents from damaging or discoloring the aircraft skin.

The aircraft window maintenance shield is designed to be placed about the window of an aircraft prior to its resurfacing, and then after the maintenance is complete it is to be disassembled and then reassembled on the next window. The assembling and disassembling are not time or energy consuming procedures.

Current aircraft maintenance procedures utilize a rotary buffing tool which rotates in clockwise direction. The right panel or first element of the instant invention has a substantially rectangular outer profile and an inner c-shaped profile (perimeter) having a first securing means such as a first inwardly curved edge or generally c-shaped edge, which is curled to engage the protruding ridge about the window frame. The outer profile (perimeter) of the right panel or the first element has an outwardly positioned lip or sidewall element for deflecting cleaning materials. The right panel engages the protruding ridge of the window frame in a snap lock relation, followed by the left panel. The left panel or second element of the instant invention also has a substantially rectangular outer profile (perimeter) and an inner c-shaped profile (perimeter) having a securing means such as a first inwardly curved or generally c-shaped edge which is curled to engage the window frame. The outer profile of the left or second element has an outwardly positioned lip or sidewall element for deflecting cleaning materials. When the panels are interconnected a protective barrier is formed to deflect the cleaning materials. The right panel has a first overlapped edge and a first overlapping edge and the left panel has a second overlapping edge and a second overlapped edge. This left panel coacts with the right panel in such a manner where it slidingly interfits, the right panel first overlapped edge is overlapped by the left panel second overlapping edge and the left panel second overlapped edge is overlapped by the right panel first overlapping edge. The oppositely oriented overlap between the two panels overlapped and overlapping edges is designed specifically to prevent the resurfacing pad utilized on the clockwise rotary buffing tool from being ripped or in some way damaged on the overlap edges. It will be noted here that if a counter-clockwise tool were employed that it is understood that the oppositely oriented overlap may be in the reverse fashion and still be in the purview of this invention. It is envisioned that panels may be affixed to an aircraft window frame with a top frame and a bottom frame as well, with both the top and bottom panel overlapped and overlapping edges being overlapped in the correct configuration depending on the rotation orientation of the rotary power tool.

The preferred embodiment of the instant invention is to be constructed of a medium gauge sheet metal. It is also recognized that certain plastics and other metals may have the material properties which would permit their use in this construction and are also envisioned to be used for such a purpose.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new aircraft window maintenance shield which has all of the advantages of the prior art and none of the disadvantages.

It is another object of the present invention to provide a new aircraft window maintenance shield which may be easily and efficiently manufactured and marketed.

It is a further objective of the present invention to provide a new aircraft window maintenance shield which is of durable and reliable construction.

An even further object of the present invention is to provide a new aircraft window maintenance shield which is susceptible of a low cost of manufacture with regard to both materials and labor, and which accordingly is then susceptible of low prices of sale to the consuming public, primarily the civilian and military aircraft industries, thereby making such aircraft window maintenance shield available to such industries.

Still yet a further object of the present invention is to provide a new aircraft window maintenance shield that will prevent tape damage to the aircraft painted surface.

It is still a further object of the present invention to provide a new aircraft window maintenance shield that will prevent window pane resurface liquids from being thrown by the action of the rotary buffing tool all over the surfaces adjacent to the aircraft window.

Still a further object of the present invention is to provide a new aircraft window maintenance shield which will prevent damage to the thermal expansion area surrounding the window.

These together with still other objects of the invention, such as the reduction in the overall man hours required for the resurfacing maintenance, and the consequent reduction in the maintenance materials costs, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 6A is a perspective view showing the right element of the aircraft window maintenance shield being affixed to the aircraft window.

FIG. 6B is a perspective view showing the left element of the aircraft window maintenance shield about to be affixed to the aircraft window.

FIG. 6C is a perspective view of both the right and left elements of the aircraft window maintenance shield affixed to the aircraft window showing how the right and left elements overlap and interfit.

DESCRIPTION OF THE PREFERRED EMBODIMENT

With reference now to the drawings, a new and improved aircraft passenger window maintenance shield embodying the principles and concepts of the present invention will be described.

Figure 1:
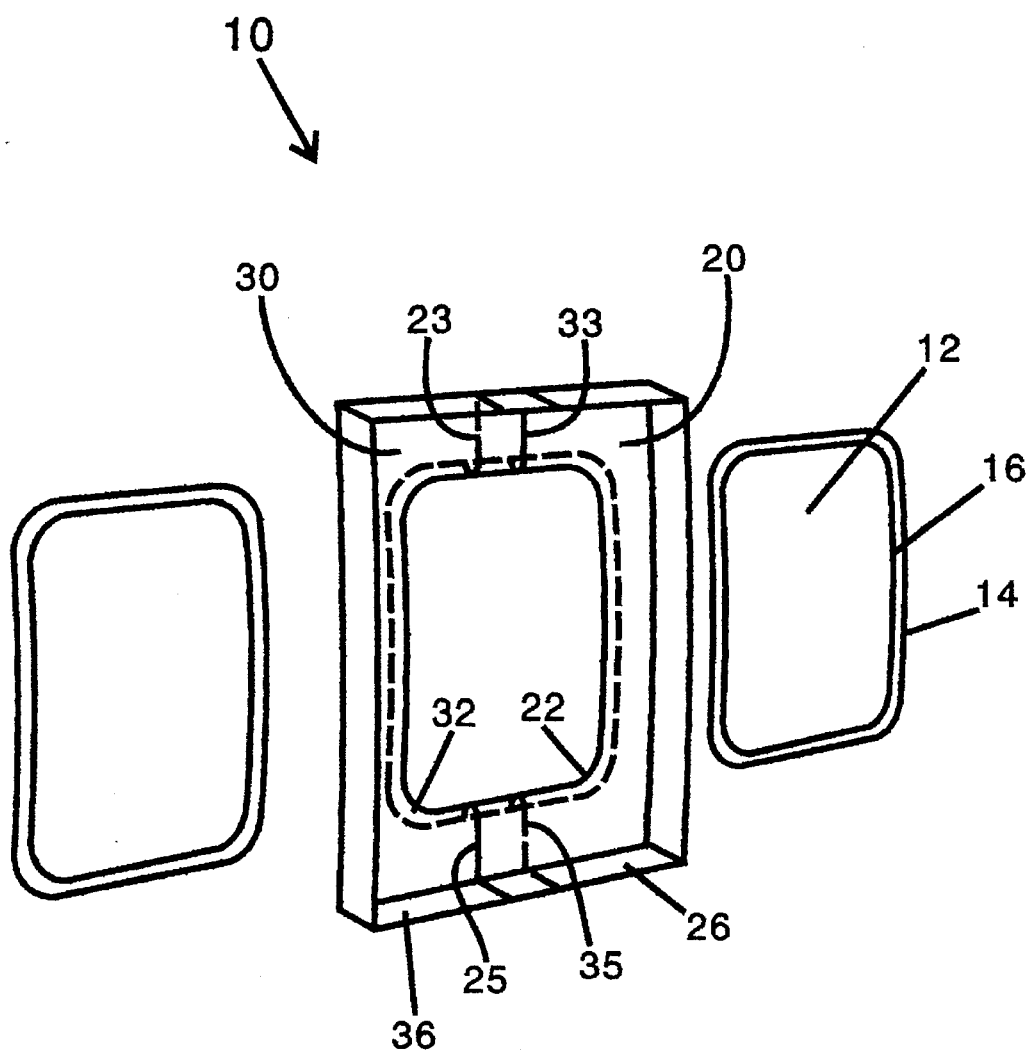
FIG. 1 is an environmental perspective view showing the preferred embodiment of the aircraft window maintenance shield of the instant invention in place about the window frame of an aircraft.
Figure 2:
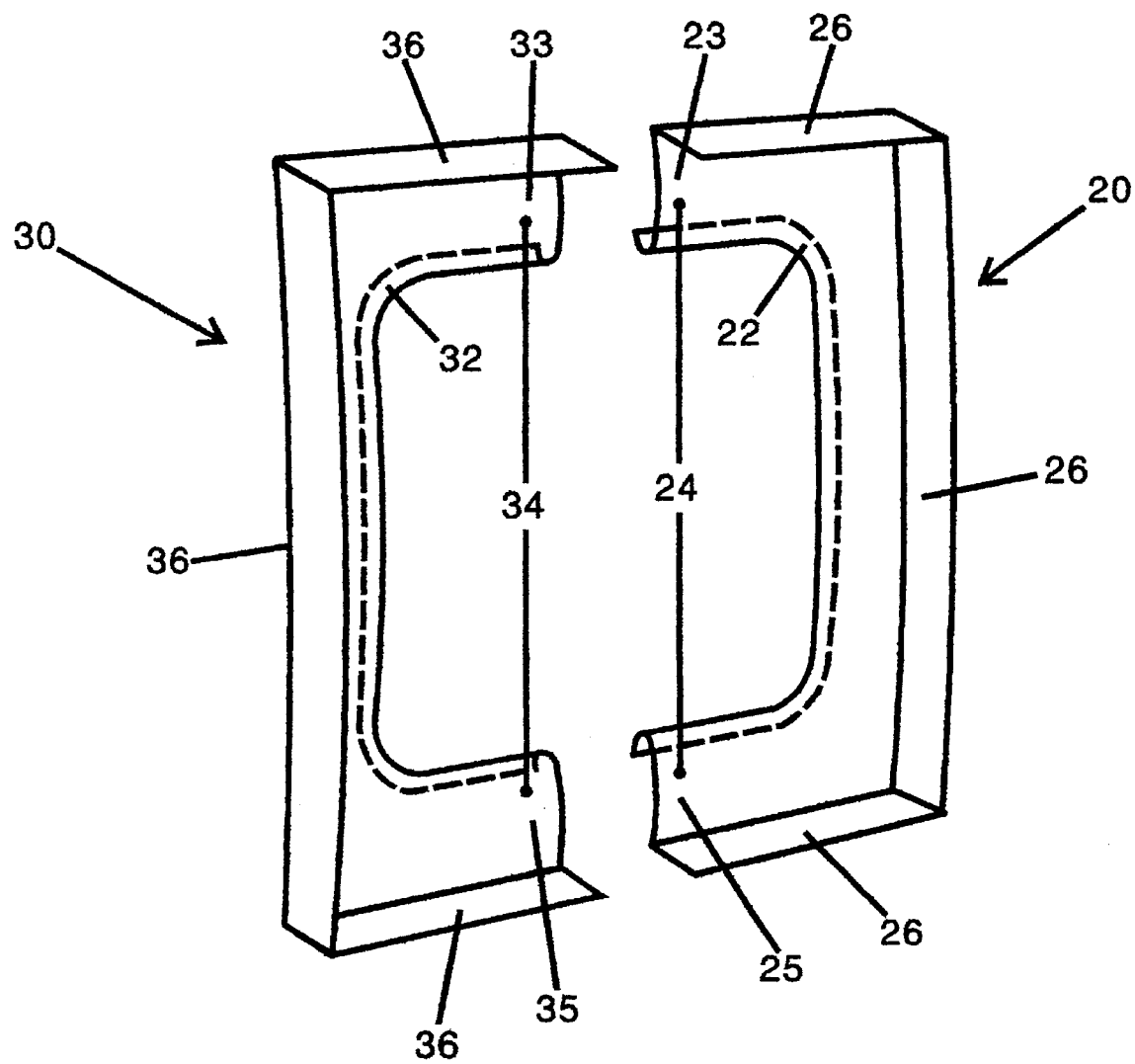
FIG. 2 is a perspective view of the aircraft window maintenance shield.
Figure 3:
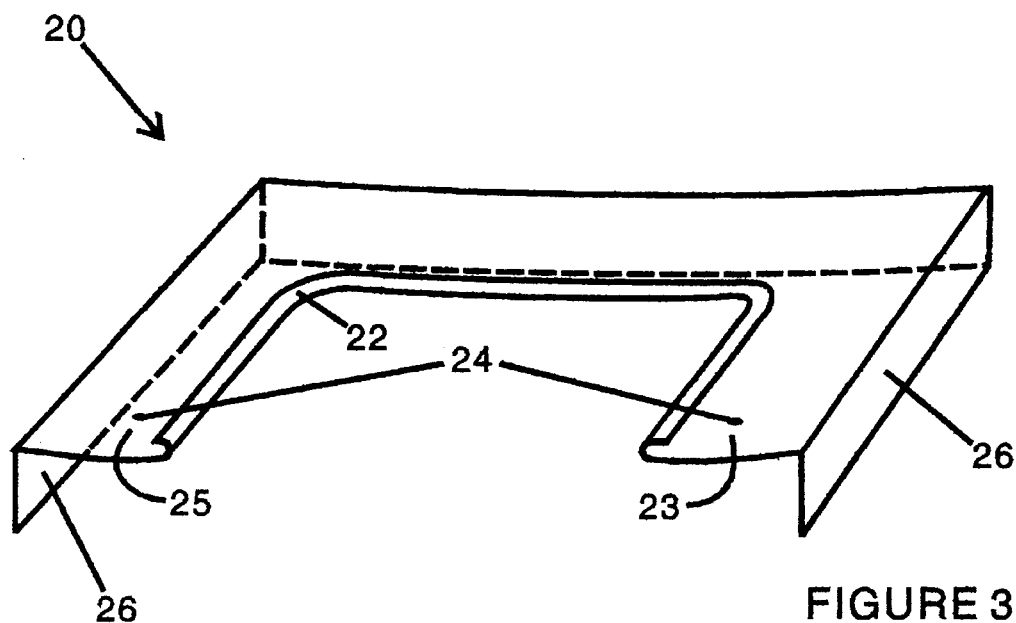
FIG. 3 is a bottom view of the right element of the aircraft window maintenance shield.
Figure 4:
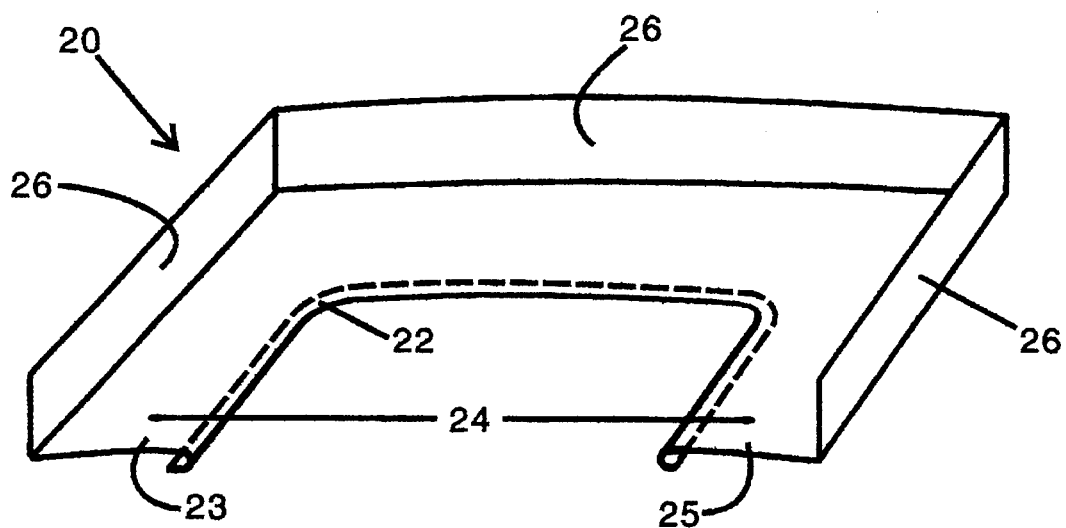
FIG. 4 is a top view of the right element of the aircraft window maintenance shield.

Turning initially to FIGS. 1–4 there is shown the exemplary embodiment of the aircraft window maintenance shield of the invention generally designated by reference numeral 10. The aircraft window 12 is surrounded by a window frame 14 having a window frame element 16. In its preferred form, aircraft window maintenance shield 10 comprises generally a right panel element 20. The right panel element 20 has a securing element 22 for securing the right panel element 20 to the window frame element 16. Sidewalls 26 surround the right hand panel 20 to prevent resurface liquids from being thrown about onto the aircraft. The aircraft window maintenance shield also comprises a left panel element 30. The left panel element 30 has a securing element 32 for securing the left panel element 30 to the window frame element 16. Sidewalls 36 surround the left hand panel 30 to prevent resurface liquids from being thrown onto the aircraft. Securing element 22 is a curled c-shaped element designed to coact with the window frame element 16 to secure the right panel element 20 firmly to the window frame 14. Securing element 32 is also a curled c-shaped element designed to coact with window frame element 16 to secure the left panel element 30 to the window frame 14. Right element sidewalls 26 and left element sidewalls 36 form a complete rectangular sidewall surrounding the aircraft window 12. When the rotary resurfacing tool is utilized this sidewall will prevent the resurface liquids from being thrown onto the skin of the aircraft. Referring specifically to FIGS. 2–4, a right panel region 24 and a left panel region 34 are shown. The right panel 20 has a right panel first overlapped edge 23 and a right panel first overlapping edge 25. The left panel 30 has a left panel second overlapping edge 33 and a left panel second overlapped edge 35. This right panel region 24 is the zone of the right panel element 20 which will be slidingly interfitted by the left panel region 34 of left panel element 30 during aircraft window maintenance shields 10 use. When the two panels are connected, the right panel first overlapped edge 23 will be overlapped by the left panel second overlapping edge 33 and the left panel second overlapped edge 35 will be overlapped by the right panel first overlapping edge 25. By use of the above overlap orientation the rotary power tool will not be damaged during the aircraft maintenance procedure.

Figure 5:
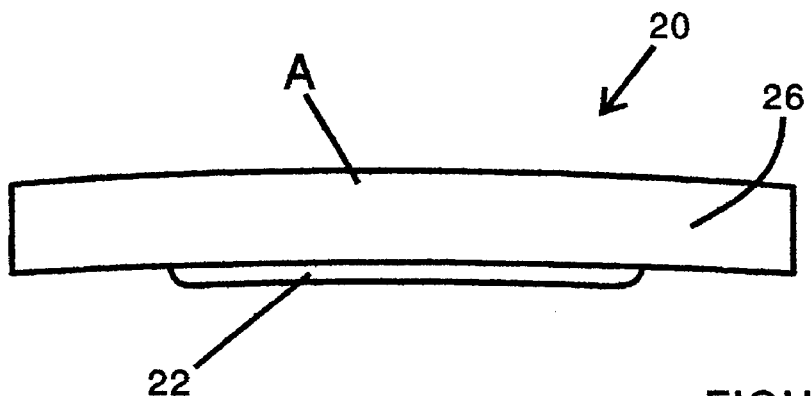
FIG. 5 is a side view of the right element of the aircraft window maintenance shield showing its arcuate shape.

FIG. 5 is a side view describing the right panel element 20 of the aircraft window maintenance shield 10. Sidewall 26 and securing element 22 are shown. The right panel element 20 is shown to have a general arcuate shape designated by A. This arcuate shape A mirrors the arcuate shape present in the aircraft window frame assembly and permits the aircraft window maintenance shield to be affixed in a skin tight fashion to the aircraft window frame assembly. The left panel element 30 has the same arcuate shape.

FIGS. 6A, 6B and 6C demonstrate the installation of the aircraft window maintenance shield 10 and describe the overlap regions. FIG. 6A shows the right panel element 20 secured to the window frame element 16 by the right securing element 22. The right panel region 24 is shown.

FIG. 6B shows the attached right panel element 20 of FIG. 6A with the left panel element 30 prior to its installation. Arrow 40 indicates the direction of which left panel element 30 is applied. Left panel element 30 is connected with right panel element 20 and left panel region 34 slidingly interfits with right panel region 24.

FIG. 6C shows the installed aircraft window maintenance shield 10. The securing elements 22 and 32 have been snapped onto the aircraft window frame element 16 and the right panel region 24 has been slidingly interfit with the left panel region 34. The right panel first overlapped edge 23 is shown being overlapped by the left panel second overlapping edge 33 and the left panel second overlapped edge 35 is shown being overlapped by the right panel first overlapping edge 25. By use of the above overlap orientation the rotary power tool will not be damaged during the aircraft maintenance procedure. At this point resurfacing maintenance operations may commence. At the completion of the resurfacing operation the aircraft window maintenance shield 10 is disassembled in a reverse order and reassembled on the next window requiring maintenance.

It is apparent from the above that the present invention accomplishes all of the objectives set forth by providing a new and improved aircraft passenger aircraft maintenance window shield.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. An aircraft passenger window maintenance shield to be affixed to an outer passenger window frame surrounding a window of an aircraft during aircraft window maintenance involving rotary powered equipment, said shield comprising:

a first element and a second element, said first element to be secured to the outer passenger window frame of the aircraft by a first securing means, said first element having a first overlapped edge and a first overlapping edge, said second element to be secured to the outer passenger window frame by a second securing means, said second element having a second overlapping edge and a second overlapped edge, said first element and said second element being slidingly interfitted with said first overlapped edge being overlapped by said second overlapping edge and said second overlapped edge being overlapped by said first overlapping edge, said first element being substantially rectangular with a first generally c-shaped opening to permit access to the aircraft window, said second element being substantially rectangular with a second generally c-shaped opening to permit access to the aircraft window, said first generally c-shaped opening having a first perimeter, said first perimeter being coincident with said first securing means, said second generally c-shaped opening having a second perimeter, said second perimeter being coincident with said second securing means, whereby, said first element and said second element are secured to the outer passenger window frame and coact with each other to form a protective barrier about the aircraft window to prevent damage to the exterior of the aircraft during routine aircraft window maintenance.

2. The shield of claim 1 wherein said first securing means comprises a first curled generally c-shaped element which coacts in a snap-fit relation with a protruding ridge on the passenger outer window frame.

3. The shield of claim 2 wherein said second securing means comprises a second curled generally c-shaped element which coacts in a snap-fit relation with a protruding ridge on the passenger outer window frame.

4. The shield of claim 3 wherein said first element includes first sidewall elements.

5. The shield of claim 4 wherein said second element includes second sidewall elements.

6. The shield of claim 5 wherein said first and second elements are constructed from sheet metal.

7. The shield of claim 6 wherein said first element is bent in an arcuate fashion.

8. The shield of claim 7 wherein said second element is bent in an arcuate fashion.

9. The shield of claim 5 wherein said first and second elements are constructed from plastic.

10. An aircraft passenger window maintenance shield to be affixed to an edge of an outer passenger window frame surrounding a window of an aircraft during aircraft window maintenance using rotary power equipment, said aircraft passenger window maintenance shield comprising:

a first element, a second element, said first element having a first c-shaped inner profile and a first substantially rectangular outer profile, said first c-shaped inner profile having a first inwardly curved edge which is curled to engage the outer passenger window frame at the edge of the window, the first outer profile having an outwardly positioned first lip to deflect any cleaning materials flung by the rotary power equipment, said first element further having a first overlapped edge and a first overlapping edge, said second element having a second c-shaped inner profile and a second substantially rectangular outer profile, said second c-shaped inner profile having a second inwardly curved edge which is curled to engage the outer passenger window frame at the edge of the window, said second outer profile having an outwardly positioned second lip to deflect any cleaning materials flung by the rotary power equipment, said second element further having a second overlapping edge and a second overlapped edge, said first overlapped edge being overlapped by said second overlapping edge and said second overlapped edge being overlapped by said first overlapping edge, whereby said first element and said second element are engaged with the outer window passenger frame at the edge of the window and form a protective barrier with said first lip and said second lip to deflect any cleaning material flung by the rotary power equipment to prohibit said materials from damaging the aircraft.

11. The shield of claim 10 wherein said first element is bent in an arcuate fashion.

12. The shield of claim 11 wherein said second element is bent in an arcuate fashion.

13. The shield of claim 12 wherein said first element and said second element are constructed of metal.

14. The shield of claim 12 wherein said first element and said second element are constructed of plastic.

15. The shield of claim 12 wherein said first inwardly curved edge is curved generally in the shape of a c.

16. The shield of claim 15 wherein said second inwardly curved edge is curved generally in the shape of a c.

17. The shield of claim 12 wherein said first element and said second element conform to the configuration of the window frame.

\* \* \* \* \*